United States Patent
Yun et al.

(10) Patent No.: US 10,295,674 B2
(45) Date of Patent: May 21, 2019

(54) SYSTEM AND METHOD FOR DETERMINING PROTECTION LEVEL

(71) Applicant: Korea Aerospace Research Institute, Daejeon (KR)

(72) Inventors: Young Sun Yun, Daejeon (KR); Eun Sung Lee, Daejeon (KR); Moon Beom Heo, Daejeon (KR); Gi Wook Nam, Daejeon (KR)

(73) Assignee: Korea Aerospace Research Institute, Daejeon (KR)

(*) Notice: Subject to any disclaimer, the term of this patent is extended or adjusted under 35 U.S.C. 154(b) by 316 days.

(21) Appl. No.: 15/342,431

(22) Filed: Nov. 3, 2016

(65) Prior Publication Data
US 2017/0184723 A1 Jun. 29, 2017

(30) Foreign Application Priority Data
Dec. 29, 2015 (KR) .................. 10-2015-0188192

(51) Int. Cl.
*G01S 19/08* (2010.01)
*G01S 19/20* (2010.01)

(52) U.S. Cl.
CPC ............ *G01S 19/08* (2013.01); *G01S 19/20* (2013.01)

(58) Field of Classification Search
CPC .......... G01S 19/08; G01S 19/20; G01S 19/23
USPC ............. 342/357.4, 357.45, 357.58, 357.61; 701/478, 478.5
See application file for complete search history.

(56) References Cited

U.S. PATENT DOCUMENTS

| | | | | |
|---|---|---|---|---|
| 2010/0324822 A1* | 12/2010 | Coatantiec | ............ | G01S 19/20 701/472 |
| 2012/0146851 A1* | 6/2012 | Fernandez | ............ | G01S 19/02 342/357.58 |
| 2015/0309177 A1* | 10/2015 | Wallace | ............ | G01S 19/41 342/357.25 |
| 2017/0363744 A1* | 12/2017 | Miya | ............ | G01S 19/07 |

OTHER PUBLICATIONS

Notice of Grounds of Rejections dated Jan. 31, 2017 From the Korean Intellectual Property Office Re. Application No. 10-2015-0188192. (6 Pages).
Han et al. "Performance Analysis of WA-DGNSS in Korea With the Selection of Reference Stations", Journal of Navigation and Port Research, 37(4): 367-373, Aug. 2013.

* cited by examiner

*Primary Examiner* — Dao L Phan

(57) ABSTRACT

Disclosed is a system for determining a protection level. The system includes a receiver configured to receive an error augmentation for a satellite orbit and clock error, an error augmentation for an ionospheric error, an error augmentation for noise and multi-path between a receiver and a satellite, and an error augmentation for a tropospheric error, a first calculator configured to calculate a first adjustment coefficient to be applied to the error augmentation for the satellite orbit and clock error and the error augmentation for the ionospheric error, and a second calculator configured to calculate a protection level by applying the first adjustment coefficient.

18 Claims, 8 Drawing Sheets
(6 of 8 Drawing Sheet(s) Filed in Color)

| VIRTUAL USER | SEJIN | | | | JEJU | | | |
|---|---|---|---|---|---|---|---|---|
| DIRECTION | HORIZONTAL | | VERTICAL | | HORIZONTAL | | VERTICAL | |
| ALERT LIMIT (m) | 10 | 20 | 10 | 20 | 10 | 20 | 10 | 20 |
| CONVENTIONAL AVAILABILITY (%) | 0 | 4.03 | 0 | 0 | 0 | 12.4593 | 0 | 20 |
| PROPOSED AVAILABILITY (%) | 99.98 | 99.99 | 91.63 | 99.98 | 99.97 | 99.98 | 93.62 | 99.98 |

SYSTEM AND METHOD FOR DETERMINING PROTECTION LEVEL

RELATED APPLICATION

This application claims the benefit of priority of Korean Patent Application No. 10-2015-0188192 filed Dec. 29, 2015, the contents of which are incorporated herein by reference in their entirety.

FIELD AND BACKGROUND OF THE INVENTION

The present invention relates to a system and method for determining a protection level, and more particularly, to a protection level determination system and method that calculate a protection level to which an adjustment coefficient is applied. An aircraft navigation system is required to acquire a position solution that may satisfy high levels of accuracy, integrity, continuity, and availability in order to perform navigation such as access and landing.

When a Global Navigation Satellite System (GNSS)-based navigation system is used alone, its performance is not sufficient. Accordingly, the performance can be improved by using augmentation systems such as a Ground Based Augmentation System (GBAS) and a Satellite Based Augmentation System (SBAS).

Since the SBAS transmits augmentation information through a signal similar to that of the GNSS broadcasted by a geostationary satellite, the SBAS may be easily utilized by an aviation user as well as the users of the GNSS in various fields.

Also, the SBAS may provide relatively uniform performance to users located in a large area and thus may be utilized in various ways.

However, an SBAS receiver for aviation calculates a protection level using integrity parameters broadcast by the SBAS in order to check availability of a position solution of the SBAS.

The protection level is a value for predicting a position error after applying SBAS augmentation information. Only when the protection level is within an allowable error level needed for performing a specific aviation task, safety is guaranteed. Thus, the position solution may be used for aviation.

In this case, in order to satisfy strict integrity requirements for its use for aviation, the SBAS transmits integrity parameters very conservatively with an assumption of the worst conditions that affect all error factors.

Thus, a user of the SBAS may obtain a very high protection level, compared to a position error that is actually experienced in a typical situation.

Accordingly, the provision of a protection level calculated according to requirements for aviation to a user who is not an aviation user does not consider the user's need, thus causing great damage to the user in terms of availability.

SUMMARY OF THE INVENTION

The present invention is directed to a protection level determination system and method that may calculate a protection level to which an adjustment level is applied.

According to an aspect of the present disclosure, there is provided a system for determining a protection level, the system including a receiver configured to receive an error augmentation for a satellite orbit and clock error, an error augmentation for an ionospheric error, an error augmentation for noise and multi-path between a receiver and a satellite, and an error augmentation for a tropospheric error; a first calculator configured to calculate a first adjustment coefficient to be applied to the error augmentation for the satellite orbit and clock error and the error augmentation for the ionospheric error; and a second calculator configured to apply the first adjustment coefficient to the error augmentation for the satellite orbit and clock error and the error augmentation for the ionospheric error and calculate a protection level using the error augmentation for the noise and multi-path between the receiver and the satellite and the error augmentation for the tropospheric error.

The first adjustment coefficient may be a value for normalizing a vertical position error with a standard deviation used for a vertical protection level and letting a normalized probability distribution be a standard normal distribution.

The second calculator may apply, to the calculated protection level, a second adjustment coefficient calculated from an integrity probability requirement allocated to a user.

The second adjustment coefficient may be calculated from an integrity risk probability allocated to an actual user protection level and an integrity probability allocated to an aviation user protection level.

The second adjustment coefficient ($\beta$) may be calculated using the following equation:

$$\beta = \frac{K_{V,NA}}{K_{V,PA}}$$

where $K_{V,PA}$ is a coefficient calculated from an integrity probability requirement allocated to the aviation user protection level, and $K_{V,NA}$ is a coefficient calculated from an integrity probability requirement allocated to the actual user protection level.

The protection level may be calculated using the following equation:

$$PL_{NA} = K\beta \sqrt{\sum_{i=1}^{N} S_i^2 \sigma_i^2}.$$

The error augmentation for the satellite orbit and clock error and the error augmentation for the ionospheric error may be received from a Satellite Based Augmentation System (SBAS).

The error augmentation for the noise and multi-path between the satellite and the receiver may vary depending on an antenna, characteristics, and an installation position of the receiver of the user.

The protection level may be provided to an aircraft.

The first adjustment coefficient may decrease strictness of the protection level.

According to another aspect of the present disclosure, there is provided a method of determining a protection level, the method including receiving an error augmentation for a satellite orbit and clock error, an error augmentation for an ionospheric error, an error augmentation for noise and multi-path between a receiver and a satellite, and an error augmentation for a tropospheric error; calculating a first adjustment coefficient to be applied to the error augmentation for the satellite orbit and clock error and the error augmentation for the ionospheric error; and calculating a protection level by applying the first adjustment coefficient.

The first adjustment coefficient may be a value for normalizing a vertical position error with a standard deviation used for a vertical protection level and letting a normalized probability distribution be a standard normal distribution.

The calculating of a protection level may include applying, to the calculated protection level, a second adjustment coefficient calculated from an integrity probability requirement allocated to a user.

The second adjustment coefficient may be calculated from an integrity risk probability allocated to an actual user protection level and an integrity probability allocated to an aviation user protection level.

The second adjustment coefficient (β) may be calculated using the following equation:

$$\beta = \frac{K_{V,NA}}{K_{V,PA}}$$

where $K_{V,PA}$ is a coefficient calculated from an integrity probability requirement allocated to the aviation user protection level, and $K_{V,NA}$ is a coefficient calculated from an integrity probability requirement allocated to the actual user protection level.

The protection level may be calculated using the following equation:

$$PL_{NA} = K\beta \sqrt{\sum_{i=1}^{N} S_i^2 \sigma_i^2}.$$

The error augmentation for the satellite orbit and clock error and the error augmentation for the ionospheric error may be received from a Satellite Based Augmentation System (SBAS).

The error augmentation for the noise and multi-path between the satellite and the receiver may vary depending on an antenna, characteristics, and an installation position of the receiver of the user.

The protection level may be provided to an aircraft.

The first adjustment coefficient may decrease strictness of the protection level.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will become more apparent to those of ordinary skill in the art by describing in detail exemplary embodiments thereof with reference to the accompanying drawings, in which.

DESCRIPTION OF SPECIFIC EMBODIMENTS OF THE INVENTION

Figure 1:
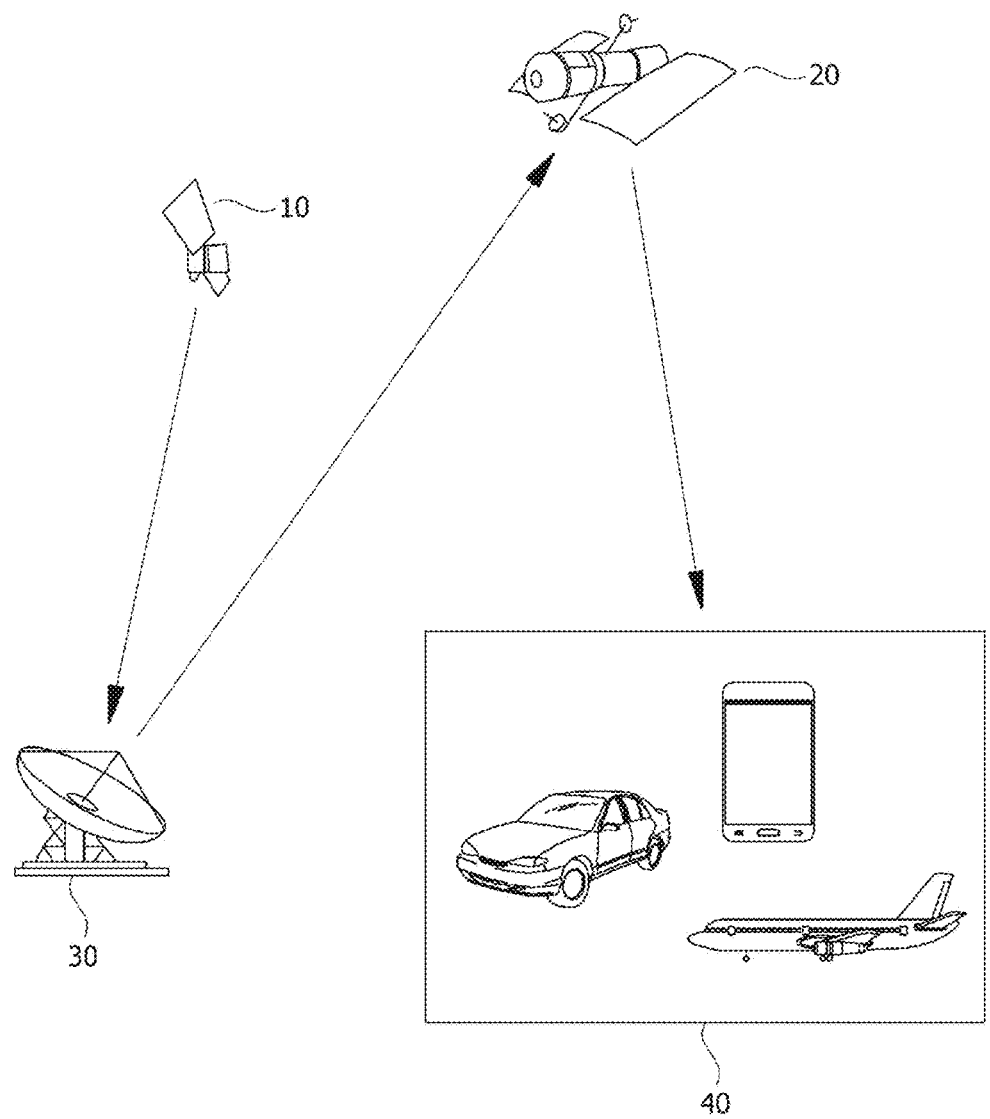
FIG. 1 is a diagram showing an operation of a satellite-based augmentation system.

The present invention is susceptible to various modifications and alternative forms, specific embodiments thereof are shown by way of example in the drawings and will herein be described in detail. It should be understood, however, that there is no intent to limit the invention to the particular forms disclosed, but conversely, the invention is to cover all modifications, equivalents, and alternatives falling within the spirit and scope of the invention.

Although the terms "first," "second," etc. may be used herein to describe various elements, these elements should not be limited by these terms. These terms are only used to distinguish one element from another. For example, a first element could be termed a second element, and similarly, a second element could be termed a first element, without departing from the scope of the present invention. The term "and/or" includes any and all combinations of one or more of associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present.

The terminology used herein is for the purpose of describing particular embodiments only and is not intended to limit the invention. The singular forms "a," "an," and "the" are intended to include the plural forms as well, unless the context clearly indicates otherwise. It will be further understood that the terms "comprises," "comprising," "includes," "including," and/or "having," when used herein, specify the presence of stated features, integers, steps, operations, elements, and/or components but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings. In the figures, the same reference numerals are used to denote the same elements throughout the drawings, and redundant descriptions thereof will be omitted.

FIG. 1 is a diagram showing an operation of a satellite-based augmentation system.

Referring to FIG. 1, a Satellite Based Augmentation System (SBAS) may include a Global Navigation Satellite System (GNSS) satellite 10, a geostationary satellite 20, a ground system 30, and a user 40.

The SBAS refers to a system that provides a user, through a geostationary satellite, with integrity information regarding the use of navigation signals as well as augmentation information such as a propagation route error or satellite clock error in the ground system 30 by using signals and navigation message information that are provided by the GNSS satellite 10 for the entire globe.

The GNSS satellite 10 may transmit signal data to a positioning target, and the positioning target may measure its position using the received signal data.

Also, the GNSS satellite 10 may be provided in plurality and includes the United States' Global Positioning System (GPS) satellite, Russia's Global Navigation Satellite System (GLONASS) satellite, the European Union's Galileo satellite, China's BeiDou satellite, Japan's Quasi-Zenith Satellite System (QZSS) satellite, etc.

Hereinafter, descriptions will be made based on the GPS.

Also, the geostationary satellite 20 may receive an SBAS signal including augmentation information and integrity information received from the ground system 30 and may frequency-convert the signal into an L-band and send the frequency-converted signal to all users 40 on the air, land, and sea.

The ground system 30 creates augmentation and integrity information for position information regarding a navigation signal for each GNSS satellite 10 that varies continuously and transmits the created augmentation and integrity information for position information.

The user 40 may be an aircraft, a cell phone, a vehicle, or the like. Also, the user 40 may calculate a position solution and a protection level using the augmentation and integrity information for position information received from the geostationary satellite.

Figure 2:
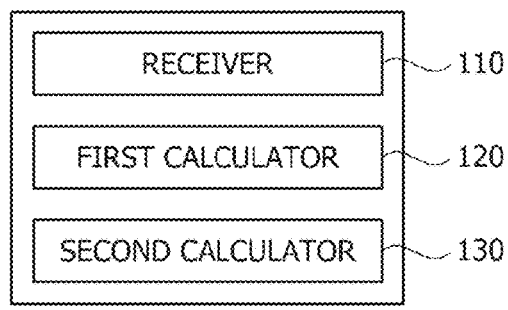
FIG. 2 is a diagram showing a protection level determination system according to an embodiment of the present invention.

FIG. 2 is a diagram showing a protection level determination system 100 according to an embodiment of the present invention. Referring to FIG. 2, the protection level determination system 100 may include a receiver 110, a first calculator 120, and a second calculator 130.

The receiver 110 may receive an SBAS error augmentation and a satellite navigation signal.

Augmentation information of the SBAS may include an error augmentation for a satellite orbit and clock error, an error augmentation for an ionospheric error, an error augmentation for noise and multi-path between a receiver and a satellite, an error augmentation for a tropospheric error, mask information, error reliability level information of augmentation message, etc.

Also, receiver 110 may receive the error augmentation and the satellite navigation signal using a ground system of the SBAS or a previous established GNSS network.

Also, the receiver 110 may receive the satellite navigation signal and may receive information regarding a position of a reference station from a GPS satellite.

The first calculator 120 may calculate a first adjustment coefficient to be applied to the error augmentation for the satellite orbit and clock error and the error augmentation for the ionospheric error.

As an example, the first adjustment coefficient may be calculated using a protection level for aviation. First, the protection level is calculated from an error level $\sigma_i^2$.

There may be a plurality of GPS satellites, and i is used to refer to an ith GPS satellite among the plurality of GPS satellites.

Also, in the following description, PA is calculated for aviation, and NA is a value that is adjusted according to a user.

The error level $\sigma_i^2$ may be calculated by a sum of an error augmentation $\sigma_{i,flt}^2$ for a satellite orbit and clock error, an error augmentation $\sigma_{i,UIRE}^2$ for an ionospheric error, an error augmentation $\sigma_{i,air}^2$, for noise and multi-path between a receiver and a satellite, and an error augmentations $\sigma_{i,tropo}^2$ for a tropospheric error, as shown in Equation (1) below:

$$\sigma_i^2 = \sigma_{i,flt}^2 + \sigma_{i,UIRE}^2 + \sigma_{i,air}^2 + \sigma_{i,tropo}^2. \quad \text{[Equation (1)]}$$

The protection level is calculated using the error level, from Equation (2) below:

$$PL(\text{Protection Level}) = K\sqrt{\sum_{i=1}^{N} S_i^2 \sigma_i^2}. \quad \text{[Equation (2)]}$$

In Equation (1), the error augmentation $\sigma_{i,flt}^2$ for the satellite orbit and clock error may be computed from User Differential Range Error (UDRE) and UDRE in the SBAS augmentation information. The UDRE is computed using a covariance matrix of a measured value, an observation matrix composed of a line-of-sight vector from a reference station to a satellite, and a covariance matrix computed during a process of estimating the satellite orbit and clock error.

The error augmentation $\sigma_{i,UIRE}^2$ for the ionospheric error may be computed from a grid ionospheric vertical error (GIVE). The GIVE is an error limit for a grid ionosphere delay.

The error augmentation $\sigma_{i,air}^2$ for the noise and multi-path between the receiver and the satellite may be a value in which characteristics of a receiver and an antenna installed in an aircraft are reflected.

The error augmentation $\sigma_{i,tropo}^2$ for the tropospheric error may be determined by a user signal reception environment irrespective of an SBAS system or a user.

In Equation (2), K may be a coefficient that is computed from an integrity probability requirement allocated to the aviation user protection level. K may be set differently depending on an approach procedure.

For example, only a horizontal protection level is used for a non-precision approach mode, and a horizontal direction and a vertical direction may be set for a precision approach mode.

Also, the error augmentation $\sigma_{i,flt}^2$ for the satellite orbit and clock error and the error augmentation $\sigma_{i,UIRE}^2$ for the ionospheric error may be determined by integrity parameters UDRE, δUDRE, GIVE, etc., which are provided through the SBAS.

However, in the SBAS, a user may conservatively determine the integrity parameters.

The UDRE may include a signal conversion error of a measured value of a GPS satellite or geostationary satellite, a code carrier oscillation error, a tropospheric error, an inter-frequency bias, a receiver clock estimation error, etc., in addition to the error augmentation for the satellite orbit and clock error.

Also, the GIVE may include error characteristics such as spatial and temporal ionospheric changes, an ionospheric model error, limitation of ionospheric grid point distribution, limitation of ionospheric measurement observability, inter-frequency bias, etc.

In order to consider the spatial and temporal ionospheric changes, the limitation of ionospheric measurement observability, etc., the SBAS may create the GIVE on the assumption of ionospheric storm effects that occur when solar activity is high.

The first adjustment coefficient α may be applied to the error augmentation $\sigma_{i,flt}^2$ for the satellite orbit and clock error and the error augmentation $\sigma_{i,UIRE}^2$ for the ionospheric error.

The first adjustment coefficient α may be obtained using a reference station position error and an aviation protection level calculated by the GPS receiver or the SBAS installed in the reference station.

The first adjustment coefficient α may be calculated using Equation (3) below:

$$\alpha = STD\left[\frac{VPE}{VPL/K_{V,PA}}\right] \quad \text{[Equation (3)]}$$

where the position error VPE is a difference between an actual position of the reference station and a position of the reference station that is obtained through GPS signals, and the vertical protection level VPL may be obtained through Equation (2) above.

Also, as an example, a coefficient $K_{V,PA}$ that is calculated from an integrity probability requirement allocated to the aviation user protection level used in Equation (3) is 5.33, and the coefficient may be calculated differently depending on an integrity risk probability allocated to a protection level that changes for each user.

Also, the first adjustment coefficient α may be determined by a case in which a probability distribution when the VPE is normalized using the standard deviation used for the VPL is a standard normal distribution.

Thus, the protection level may be calculated according to a user's characteristics, rather than the conservative aviation protection level. Also, when the first adjustment coefficient α is greater than zero and less than one, the adjusted error level $\sigma_{i,NA}^2$ may decrease.

Also, the first adjustment coefficient α may be a coefficient for vertically adjusting a protection level. In addition, the protection level may be horizontally adjusted depending on the vertical adjustment.

Thus, the protection level may be easily calculated only by vertically adjusting the first adjustment coefficient α.

The adjusted error level $\sigma_{i,NA}^2$ may be calculated in consideration of the first adjustment coefficient α using Equation (4). Also, when the first adjustment coefficient α is greater than zero and less than one, the adjusted error level $\sigma_{i,NA}^2$ may decrease, thus increasing availability of the conservative protection level and decreasing conservativeness thereof.

$$\sigma_{i,NA}^2 = \alpha^2(\sigma_{i,flt}^2 + \sigma_{i,UIRE}^2) + \sigma_{i,air}^2 + \sigma_{i,tropo}^2. \quad \text{[Equation 4]}$$

The second calculator 130 may apply the first adjustment coefficient α to calculate the adjusted protection level. Also, the second calculator 130 may apply, to the calculated protection level, a second adjustment coefficient β calculated from an integrity probability requirement allocated to a user.

As an example, the second adjustment coefficient β may be calculated from an integrity risk probability allocated to an actual user protection level and an integrity probability allocated to an aviation user protection level.

An integrity risk probability $K_A$ allocated to a vertical protection level for an aviation precision approach is 1×10⁻⁷, and $K_{V,PA}$ may be calculated as 5.33 from a cumulative distribution function of a normal distribution. When an integrity risk probability $K_N$ allocated to the vertical protection level of the user is set as 1×10⁻³, $K_{V,NA}$ may be calculated as 3.29.

The second adjustment coefficient β is a ratio of the coefficient $K_{V,NA}$ calculated from the integrity probability requirement allocated to the actual user protection level to the coefficient $K_{V,PA}$ calculated from the integrity probability requirement allocated to the aviation user protection level.

The second adjustment coefficient β may be calculated using Equation (5) below:

$$\beta = \frac{K_{V,NA}}{K_{V,PA}}. \quad \text{[Equation 5]}$$

Also, a horizontal coefficient $K_H$ may be calculated using a Rayleigh distribution.

The calculated adjustment coefficients α and β may be regularly transmitted to the user by the ground system or may be stored in and used by a user receiver as a conservative value obtained through data collection over a long period.

The adjusted protection level $PL_{NA}$ to which the second adjustment coefficient β is applied may be calculated using Equation (6) below. Thus, the adjusted protection level may be calculated according to task characteristics of the user.

$$PL_{NA} = K\beta\sqrt{\sum_{i=1}^{N} S_i^2 \sigma_i^2}. \quad \text{[Equation 6]}$$

Figure 3:
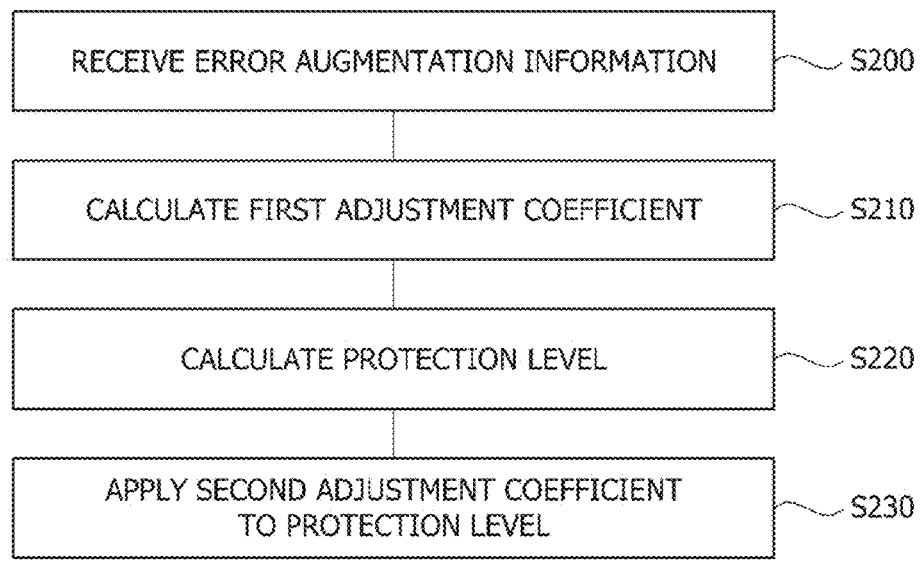
FIG. 3 is a flowchart showing a protection level determination method according to an embodiment of the present invention.

FIG. 3 is a flowchart showing a protection level determination method according to an embodiment of the present invention.

First, a reference station or a ground station receives an error augmentation for a satellite orbit and clock error, an error augmentation for an ionospheric error, an error augmentation for noise and multi-path between a receiver and a satellite, and an error augmentation for a tropospheric error (S200).

Next, a first adjustment coefficient to be applied to the error augmentation for the satellite orbit and time error and the error augmentation for the ionospheric error is calculated (S210). Thus, an error level may be adjusted according to an actual user.

Also, the first adjustment coefficient may be applied to calculate a protection level (S220), and a second adjustment coefficient calculated from an integrity probability requirement allocated to a predetermined user may be applied to the calculated protection level to calculate the applied protection level (S230).

The user may receive the first and second adjustment coefficients α and β from the ground system. The protection level may be calculated using the received first and second adjustment coefficients α and β. Alternatively, the protection level may be calculated using the first adjustment coefficient α received from the ground system and the second adjustment coefficient β stored for the user.

In FIGS. 4 to 10, in order to calculate the adjusted protection level, a Multipurpose Transportation Satellite (MTSAT)-based expansion system data provided by Centre National d'Etudes Spatiales (CNES) and GPS data provided by an International GNSS Service (IGS) reference station and National Geographic Information Institute were utilized as data for a ground monitoring station.

Here, the ground monitoring station may receive an SBAS error augmentation and satellite navigation signal data to calculate the first adjustment coefficient.

In order to determine the adjusted coefficient, data of reference stations TSK2 and AIRA in Japan and reference stations PUSN and GANH in South Korea that had been stored every 30 seconds for 24 hours on Jun. 28, 2016 was used.

Also, an adjustment coefficient determined for data collected every second was applied to the above time on the assumption that reference stations JEJU and SEJN in South Korea are each the predetermined user.

PEGASUS was used to process data of the MTSAT-based expansion system data and compute a position solution of the user. A result processed by PEGASUS was utilized to compute adjustment coefficient and a predetermined user protection level.

Figure 4:
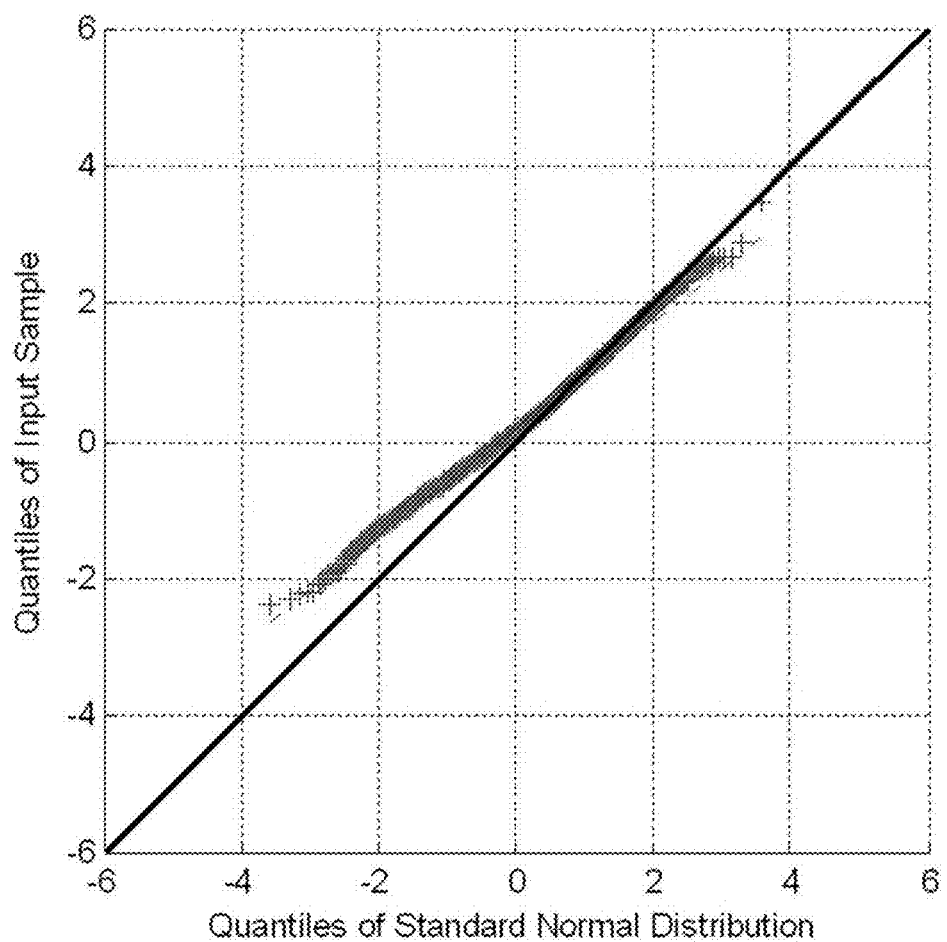
FIG. 4 is a graph showing an example of a quantile-quantile (Q-Q) plot of vertical position error that is normalized after a protection level is applied.
Figure 5:
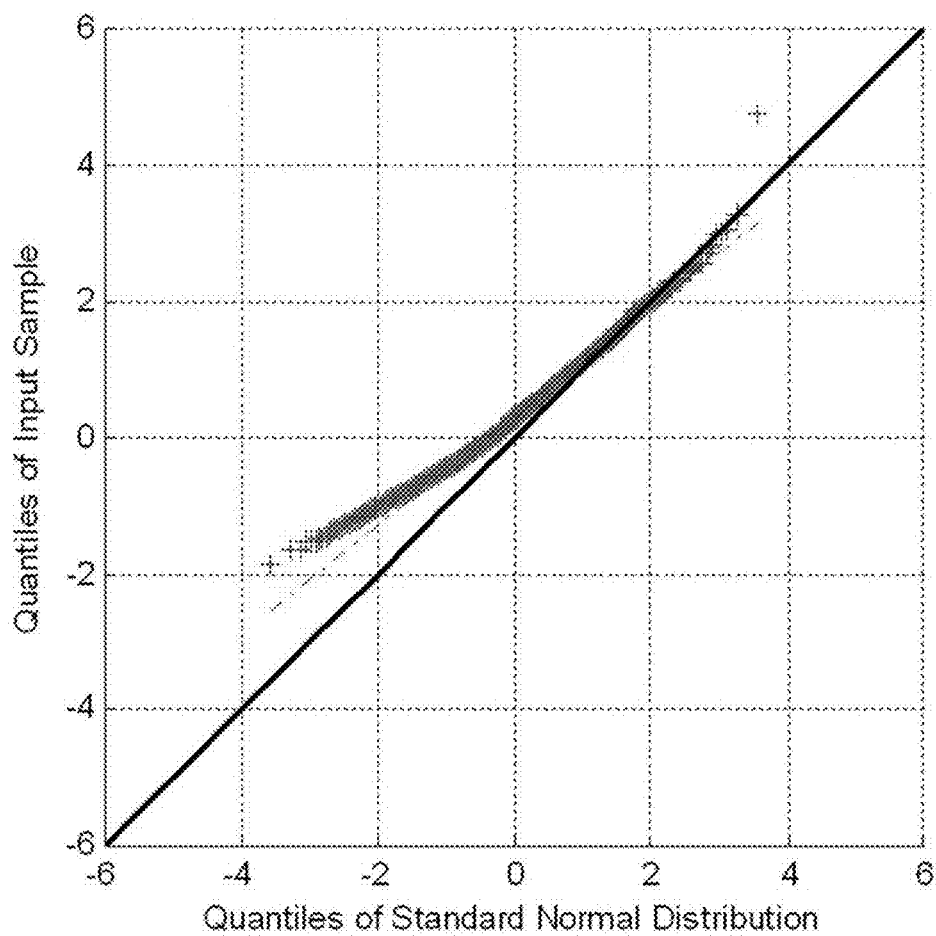
FIG. 5 is a graph showing another example of a Q-Q plot of vertical position error that is normalized after a protection level is applied.

FIG. 4 is a normalized quantile-quantile (Q-Q) plot of a vertical position error in which the adjustment coefficient is applied to reference station TSK2 in Japan, and FIG. 5 is a normalized Q-Q plot of a vertical position error in which the adjustment coefficient is applied to reference station GANH in South Korea.

FIGS. 4 and 5 are graphs in which a first adjustment coefficient set as 0.2 is reflected. Also, the second adjustment coefficient $\beta$ is calculated as 0.62 (by reflecting an integrity risk probability $1\times10^{-3}$ to horizontal and vertical protection levels).

Referring to FIGS. 4 and 5, when the adjustment coefficients are applied, a vertical position error distribution with a slope close to 1 can be shown. Thus, it can be seen that when the adjustment coefficients are used, strictness for an aviation user decreases, and a result reflecting an actual user's environment is provided.

Figure 6:
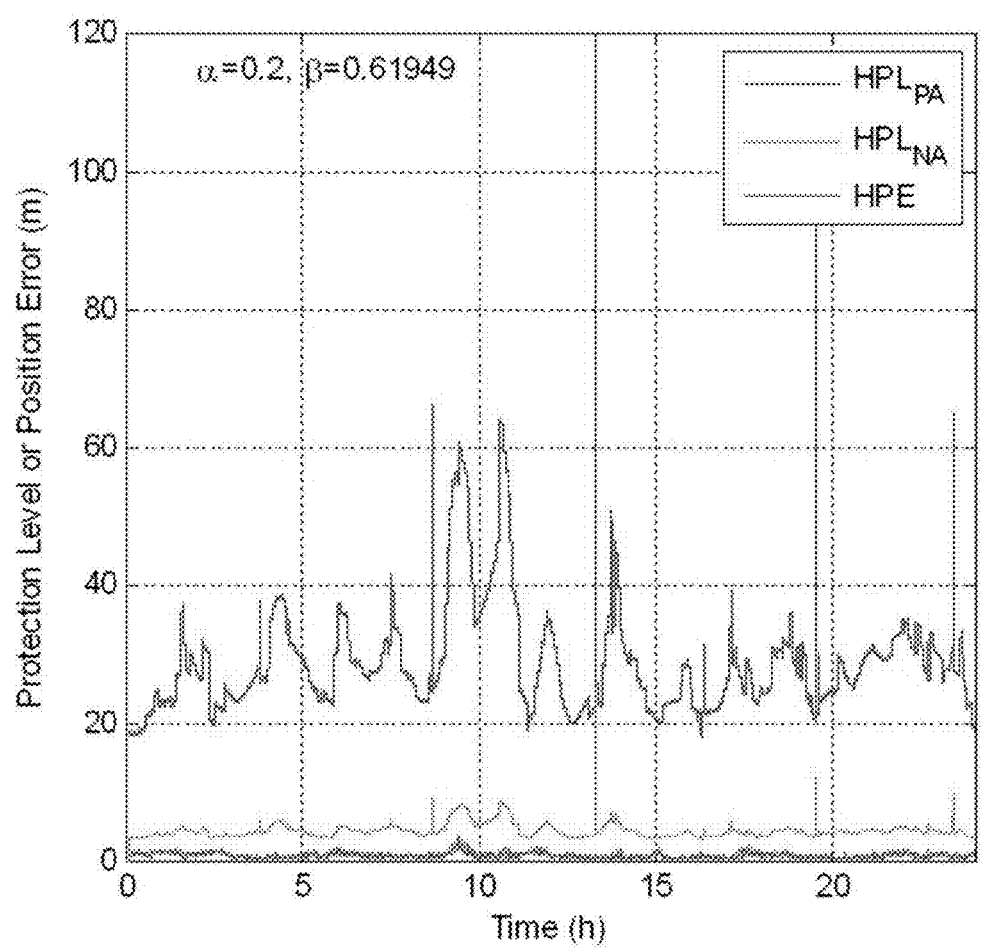
FIGS. 6 and 7 are graphs showing protection level and position error of an example.
Figure 7:
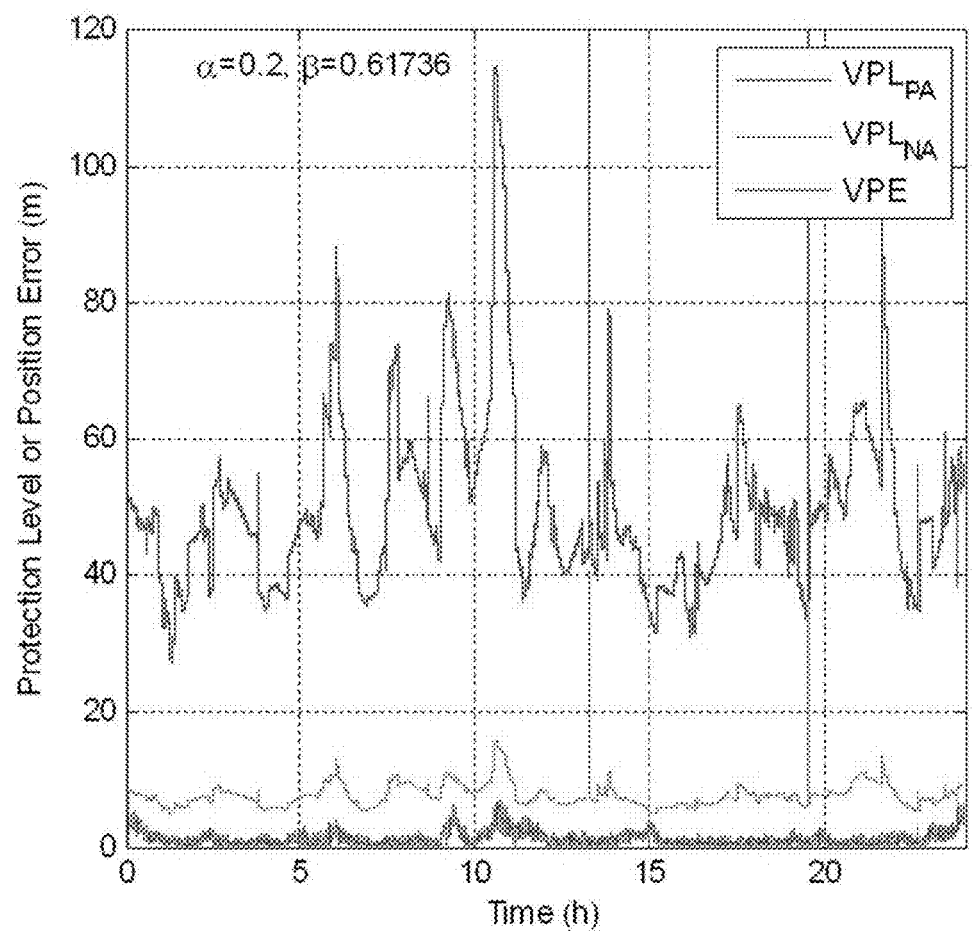

FIGS. 6 and 7 are graphs showing a protection level and a position error that are obtained by applying the determined adjustment coefficients to a predetermined user located in the reference station SEJIN.

The adjusted horizontal and vertical protection levels $HPL_{NA}$ and $VPL_{NA}$ become much smaller than horizontal and vertical aviation protection levels $HPL_{PA}$ and $VPL_{PA}$ but include position errors HPE and VPE, respectively.

Figure 8:
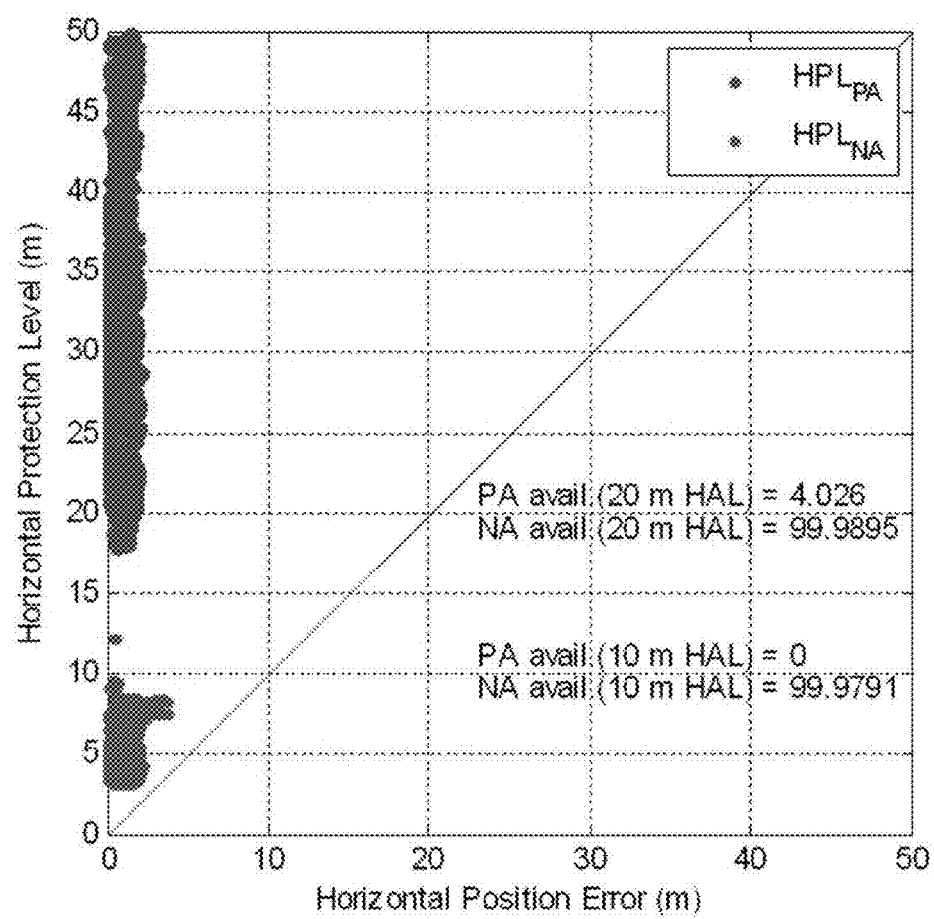
FIGS. 8 and 9 are graphs showing an example in Stanford plots.
Figures 9, 10:
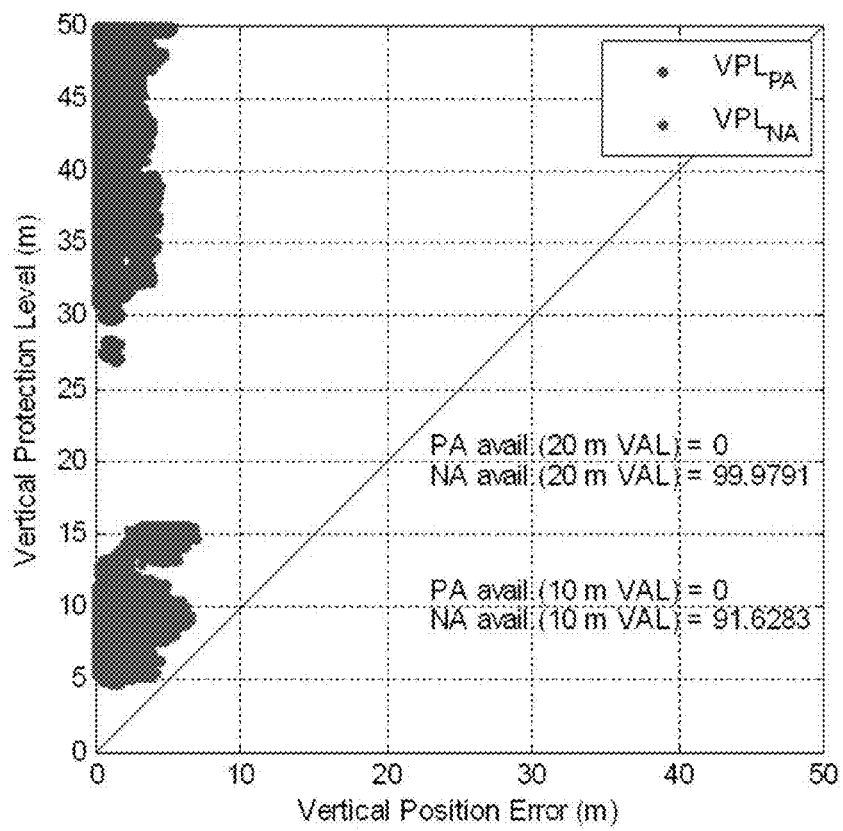
FIG. 10 is a table for comparing availability of an example according to an alert limit.

FIGS. 8 and 9 are graphs showing the results of FIGS. 6 and 7 in Stanford plots. FIG. 10 is a table that summarizes FIGS. 8 and 9.

Referring to FIGS. 8 to 10, it can be seen than when vertical and horizontal alert limits are each 10 m or 20 m, availability of a position solution rapidly increases.

That is, it can be seen that the protection level to which the adjustment coefficient is applied has enhanced availability, compared to an aviation protection level.

It can also be seen that integrity performance is satisfied and maintained because the position error does not exceed the protection level.

Thus, the protection level can be adjusted and calculated according to characteristics of a user of a satellite-based augmentation system. Also, the availability of the position solution may be greatly enhanced according to the adjusted protection level.

In addition, the system can be implemented without incurring a high cost because information of a previously established satellite-based augmentation system may be used.

The protection level determination system according to an embodiment may be applied to various devices such as an aircraft, a vehicle, a drone, etc. However, embodiments of the present invention are not limited thereto.

According to the present invention, it is possible to adjust a protection level that is excessively conservatively calculated for each user, according to the user's characteristics.

It is also possible to greatly improve availability of a position solution of a specific task of the user and variously expand an application field of the SBAS.

It is also possible to implement the system of the present invention without great cost because data of a Global Navigation Satellite System (GNSS) receiver station network that is previously established in the country may be utilized.

The term "unit" used herein refers to a hardware element such as field-programmable gate array (FPGA) or application-specific integrated circuit (ASIC) and performs any role. However, the term "unit" is not limited to software or hardware, and a "unit" may be constituted to be in a storage medium that may be addressed or may be constituted to play one or more processors. Therefore, for example, the "unit" includes elements, such as software elements, object-oriented elements, class elements, and task elements, processes, functions, attributes, procedures, sub routines, segments of a program code, drivers, firmware, a microcode, a circuit, data, a database (DB), data structures, tables, arrays, and parameters. Functions provided in elements and "units" may be combined as the smaller number of elements and "units" or may be separated as additional elements and "units."

Additionally, the elements and "units" may be implemented to execute one or more CPUs in a device or a security multimedia card.

While one or more embodiments have been described with reference to the figures, it will be understood by those of ordinary skill in the art that various changes in form and details may be made therein without departing from the spirit and scope of the present invention as defined by the appended claims.

What is claimed is:

1. A system for determining a protection level, the system comprising:
    a receiver configured to receive an error augmentation for a satellite orbit and clock error, an error augmentation for an ionospheric error, an error augmentation for noise and multi-path between a receiver and a satellite, and an error augmentation for a tropospheric error;
    a first calculator configured to calculate a first adjustment coefficient to be applied to the error augmentation for the satellite orbit and clock error and the error augmentation for the ionospheric error; and
    a second calculator configured to apply the first adjustment coefficient to the error augmentation for the satellite orbit and clock error and the error augmentation for the ionospheric error and calculate a protection level using the error augmentation for the noise and multi-path between the receiver and the satellite and the error augmentation for the tropospheric error;
    wherein the second calculator applies, to the calculated protection level, a second adjustment coefficient calculated from an integrity probability requirement allocated to a user.

2. The system of claim 1, wherein the first adjustment coefficient is a value for normalizing a vertical position error with a standard deviation used for a vertical protection level and letting a normalized probability distribution be a standard normal distribution.

3. The system of claim 1, wherein the second adjustment coefficient is calculated from an integrity risk probability allocated to an actual user protection level and an integrity probability allocated to an aviation user protection level.

4. The system of claim 3, wherein the second adjustment coefficient ($\beta$) is calculated using the following equation:

$$\beta = \frac{K_{V,NA}}{K_{V,PA}}$$

where $K_{V,PA}$ is a coefficient calculated from an integrity probability requirement allocated to the aviation user protection level, and $K_{V,NA}$ is a coefficient calculated from an integrity probability requirement allocated to the actual user protection level.

5. The system of claim 4, wherein the protection level is calculated using the following equation:

$$PL_{NA} = K\beta \sqrt{\sum_{i=1}^{N} S_i^2 \sigma_i^2}.$$

6. The system of claim 1, wherein the error augmentation for the satellite orbit and clock error and the error augmentation for the ionospheric error are received from a Satellite Based Augmentation System (SBAS).

7. The system of claim 1, wherein the error augmentation for the noise and multi-path between the satellite and the receiver varies depending on an antenna, characteristics, and an installation position of the receiver of the user.

8. The system of claim 1, wherein the protection level is provided to an aircraft.

9. The system of claim 1, wherein the first adjustment coefficient decreases strictness of the protection level.

10. The method of claim 1, wherein the first adjustment coefficient is a value for normalizing a vertical position error with a standard deviation used for a vertical protection level and letting a normalized probability distribution be a standard normal distribution.

11. A method of determining a protection level, the method comprising:
receiving an error augmentation for a satellite orbit and clock error, an error augmentation for an ionospheric error, an error augmentation for noise and multi-path between a receiver and a satellite, and an error augmentation for a tropospheric error;
calculating a first adjustment coefficient to be applied to the error augmentation for the satellite orbit and clock error and the error augmentation for the ionospheric error; and
calculating a protection level by applying the first adjustment coefficient;
wherein the calculating of a protection level comprises applying, to the calculated protection level, a second adjustment coefficient calculated from an integrity probability requirement allocated to a user.

12. The method of claim 11, wherein the second adjustment coefficient is calculated from an integrity risk probability allocated to an actual user protection level and an integrity probability allocated to an aviation user protection level.

13. The method of claim 12, wherein the second adjustment coefficient ($\beta$) is calculated using the following equation:

$$\beta = \frac{K_{V,NA}}{K_{V,PA}}$$

where $K_{V,PA}$ is a coefficient calculated from an integrity probability requirement allocated to the aviation user protection level, and $K_{V,NA}$ is a coefficient calculated from an integrity probability requirement allocated to the actual user protection level.

14. The method of claim 13, wherein the protection level is calculated using the following equation:

$$PL_{NA} = K\beta \sqrt{\sum_{i=1}^{N} S_i^2 \sigma_i^2}.$$

15. The method of claim 11, wherein the error augmentation for the satellite orbit and clock error and the error augmentation for the ionospheric error are received from a Satellite Based Augmentation System (SBAS).

16. The method of claim 11, wherein the error augmentation for the noise and multi-path between the satellite and the receiver varies depending on an antenna, characteristics, and an installation position of the receiver of the user.

17. The method of claim 11, wherein the protection level is provided to an aircraft.

18. The method of claim 11, wherein the first adjustment coefficient decreases strictness of the protection level.

\* \* \* \* \*